US012246786B2

(12) United States Patent
Minor et al.

(10) Patent No.: US 12,246,786 B2
(45) Date of Patent: Mar. 11, 2025

(54) SYSTEM AND METHOD FOR RECONFIGURING A TRUCK BODY

(71) Applicant: Custom Truck One Source, Inc., Kansas City, MO (US)

(72) Inventors: Zach Minor, Kansas City, MO (US); Hayden Ernst, Kansas City, MO (US); Kyle Gerber, Kansas City, MO (US)

(73) Assignee: Custom Truck One Source, Inc., Kansas City, MO (US)

( * ) Notice: Subject to any disclaimer, the term of this patent is extended or adjusted under 35 U.S.C. 154(b) by 205 days.

(21) Appl. No.: 18/150,693

(22) Filed: Jan. 5, 2023

(65) Prior Publication Data

US 2024/0227959 A1 Jul. 11, 2024

(51) Int. Cl.
*B62D 63/02* (2006.01)
*B62D 63/04* (2006.01)

(52) U.S. Cl.
CPC .......... *B62D 63/025* (2013.01); *B62D 63/04* (2013.01)

(58) Field of Classification Search
CPC ........ B62D 65/00; B62D 21/02; B62D 21/12; B62D 21/14; B62D 33/08
See application file for complete search history.

(56) References Cited

U.S. PATENT DOCUMENTS

| | | |
|---|---|---|
| 3,134,492 A | 5/1964 | Parsen |
| 3,533,515 A | 10/1970 | Milner, Jr. |
| 4,838,605 A | 6/1989 | Abromavage |
| 6,199,894 B1 * | 3/2001 | Anderson ............ B62D 63/025 180/209 |
| 7,896,606 B2 | 3/2011 | Ethington |
| 7,914,082 B2 | 3/2011 | Kraenzle |
| 8,534,981 B1 | 9/2013 | Bortz |
| 10,160,373 B2 | 12/2018 | Tovornik |

(Continued)

FOREIGN PATENT DOCUMENTS

| | | | |
|---|---|---|---|
| DE | 20312500 U1 * | 2/2005 | ............. B62D 21/12 |
| EP | 2165962 A1 | 3/2010 | |
| EP | 2184220 B1 | 4/2013 | |

OTHER PUBLICATIONS

Shawmut Equipment, Introducing New Short Configuration NBT45127-1 Boom Truck, Aug. 12, 2020, https:www.shawmutequipment.com/news/introducing-new-short-configuration-nbt45127-1-boom-truck.

(Continued)

*Primary Examiner* — James A English
(74) *Attorney, Agent, or Firm* — Robert J. Lambrechts; Lathrop GPM LLP

(57) ABSTRACT

A method for reconfiguring a truck body that includes selecting a truck with a cab section and two original frame rails extending from beneath the cab section and rearwardly to a distal first and second end. The truck body also includes an axle with a differential. The truck body also includes a drive shaft with a first end and a second end, the first end of the driveshaft operably connected to an output shaft of a transmission, the drive shaft extending rearwardly for operable engagement of the second end with the differential. Next, the drive shaft and axle are disconnected and the two frame rails are severed proximate the cab section resulting in new first and second distal ends for the frame rails and an operable unit supported by a support frame is secured to the new distal ends of the frame rails.

19 Claims, 8 Drawing Sheets

(56) References Cited

U.S. PATENT DOCUMENTS

| | | | | |
|---|---|---|---|---|
| 2006/0036363 A1* | 2/2006 | Crook | ................ | G08G 1/09685 |
| | | | | 340/995.19 |
| 2009/0223918 A1* | 9/2009 | Johnston | ................ | B66C 23/78 |
| | | | | 212/294 |
| 2011/0121554 A1* | 5/2011 | Olson | .................... | B62D 21/20 |
| | | | | 280/781 |
| 2016/0243990 A1* | 8/2016 | Portney | .................... | B60R 3/00 |
| 2018/0093727 A1* | 4/2018 | Cox | ........................ | B62D 21/12 |
| 2023/0202566 A1* | 6/2023 | Grinstead | .............. | B62D 21/14 |
| | | | | 280/781 |

OTHER PUBLICATIONS

Ram Trucks, Chassis Cab Frame Alteration recommendations, 9-1-20214, www.ramtrucks.com/BodyBuilder/service/image?imageid+MtQrP%2FFql.Y5r%2Fest8MtGjGghzAHGUTU0WB3rWuqSYZ7YmQ2vEhuBWBHwE0oZie3eN%0A.

Chassisworks, How to Reframe a Late-Model Truck, dated Aug. 14, 2021, https://solo.tips/download/build-it-correctly-with-new-chassisworks-kits-and-products.

US 281, US 281 Frame Shortening, Aug. 22, 2022, https://www.us281trucktrailerservices.com/services/frame-extension.html.

Palmer Power & Truck Equipment, Work Truck Frame and Wheelbase Alterations, dated Aug. 22, 2022, https:palmerpowered.com/work-truck-frame-and-wheelbase-alterations.

\* cited by examiner

SYSTEM AND METHOD FOR RECONFIGURING A TRUCK BODY

FIELD OF THE DISCLOSURE

A system and method for reconfiguring a commercial truck body providing a lower center of gravity, increased fuel efficiency, lowered greenhouse gas emissions and a decreased turning radius of the vehicle as well as to move or increase the number of axles to comply with state and federal bridge weight limits.

BACKGROUND

Almost all commercial trucks share a common construction: they are made of a chassis, a cab, an area for placing cargo or equipment, axles, suspension and roadwheels, an engine and a drivetrain. Pneumatic, hydraulic, water, and electrical systems may also be present. Many also tow one or more trailers or semi-trailers.

A truck frame consists of two parallel boxed (tubular) or C-shaped rails, or beams, held together by crossmembers. These frames are referred to as ladder frames due to their resemblance to a ladder if tipped on end. The rails consist of a tall vertical section (two if boxed) and two shorter horizontal flanges. The height of the vertical section provides opposition to vertical flex when weight is applied to the top of the frame (beam resistance). Though typically flat the whole length on heavy-duty trucks, the rails may sometimes be tapered or arched for clearance around the engine or over the axles. The holes in rails are used either for mounting vehicle components and running wires and hoses or measuring and adjusting the orientation of the rails at the factory or repair shop.

Because of their size and tremendous power, trucks can present a considerable safety risk. In 2018, in the United States, 5,096 large trucks and buses were involved in fatal crashes. In 2018 a total of 112,000 large trucks were involved in injury crashes. In the same year 414,000 large trucks were involved in property damage only crashes. Clearly, any improvements that can be brought to bear on improving the safety of large trucks may yield enormous benefits in lives saved and reductions in financial losses.

SUMMARY OF THE INVENTION

Trucks are absolutely essential to the construction industry. Not only do commercial construction trucks handle most of the heavy lifting on the job site, they also play an important role in keeping crews as safe, productive, and efficient as possible. Investing in the right work trucks helps construction business grow and keep up with the ever-growing demands of the industry.

The ability to reconfigure a truck from the cab rearward to maximize safety, fuel efficiency and load carrying capacity provides the prospective buyer with many potential enhancements. For example, bridges on the Interstate System highways are designed to support a wide variety of vehicles and their expected loads. As trucks grew heavier in the 1950s and 1960s, something had to be done to protect bridges. The solution was to link allowable weights to the number and spacing of axles.

In 2015 the Federal Highway Administration (FHWA) revised its guidance pamphlet Federal Bridge Formula Weights. The federal statute addressing bridge formula weights is found at 23 U.S.C. § 127 and the federal regulations are found at 23 C.F.R. § 658. Axle spacing is as important as axle weight in designing bridges. The stress on bridge members as a longer truck rolls across is much less than that caused by a short vehicle even though both trucks have the same total weight and individual axle weights. The weight of the longer vehicle is spread out, while the weight of the shorter vehicle is concentrated on a smaller area.

The method disclosed herein for reconfiguring a truck body requires acquiring a truck with a cab and two frame rails extending from beneath the cab and rearwardly to a distal first and second end. The truck includes at least one axle with a differential wherein the axle with differential is secured to the two original frame rails near the distal ends. Additionally, a drive shaft spans between U-joints at the output shaft of a transmission powered by an engine and the U-joints proximate the differential.

The system and method as disclosed herein requires disconnecting the drive shaft and other elements such as hydraulic or pneumatic brake lines and electrical cabling from the differential and axles and detaching the one or more axles from the original frame rails. Next, the method requires severing the two frame rails proximate the cab resulting in new first and second distal ends for the frame rails. The next critical step is the attaching to the new distal ends of the frame rails a support structure which will in turn support an operable unit such as a dump body, a water truck, fuel truck, cement mixer or an extensible boom crane.

This list of operable units should not be considered exhaustive and is only intended as an exemplary list. The attachment of the support structure occurs in such a manner that the support structure provides a lower elevation relative to what would have been the elevation of the operable unit if it had been mounted on top of the original frame rails. The lowering in elevation of the operable unit should be equivalent to at least the height of the truck's frame rails and potentially more.

This lower elevational placement of the operable unit on the support frame provides a lower center of gravity than if mounted to the original frame rails. A lower overall height of the operable unit may provide improved handling of the assembled system as the maximum truck height in most states because of overpass limitations, is 13 feet, 6 inches. The federal government recommends that bridges on public roads have a clearance of at least 14 feet so that trucks at the maximum permissible height can safely pass beneath the bridges.

In addition to the above-described benefits, the operable unit may have a different overall length than if mounted to the original frame rails. An increased overall length of the cab and operable unit may improve the ability of the assembled cab and operable unit to traverse bridges configured to be fully compliant with the Federal Highway Administration regulations on truck size and weight found at 23 CFR § 658 titled Length, Width and Weight Limitations. The system and method disclosed herein anticipates that at least one and possibly multiple axles may be reattached to the frame rails and separated by greater distances thereby expanding the number of bridges that the assembled unit can traverse fully compliant with federal regulations.

One of the fundamental concepts of the system and method disclosed herein is the merging of a "truck crane" with a "boom truck". Truck cranes have historically been designed from the ground up to be a crane with the transport of the crane as a matter of secondary importance. They have superb lifting performance; however, when it comes to transport, they are slow and the driving cabs are spartan and generally uncomfortable. On the contrary, boom trucks were intended to be mobile as a matter of primary importance at the cost of some performance in capacity compared to truck cranes. The disclosed method and system of truck reconfiguration achieves the best of both worlds, combining the performance of a commercial truck crane with the mobility, speed, and comfort of a boom truck.

Also, from an engineering standpoint, keeping up with emission requirements imposed by the evolving policies of federal and state government is a daunting task for any engineering department. By attaching a crane to a commercial chassis and leaving the exhaust system intact, the crane engineering team does not have to address emission control requirements. This is not the case with a truck crane. When designing a full truck crane, it is the responsibility of the crane engineering team to ensure the design of the emissions system complies with all applicable state and federal regulations.

The frame rails of a typical truck subject to the method disclosed herein are extremely rigid and robust, in many cases 12 or more inches in height, and therefore of considerable weight per linear foot of rail. It is estimated that by severing the frame rails near the back of the cab that roughly 1,500 to 2,000 pounds of frame rail steel is removed. This removal of weight serves to improve fuel efficiency of the commercial truck. While the support structure and integrated operable unit increases the weight of the fully assembled truck, the operable unit is not positioned atop the entire original span of the frame rails. Instead, the system and method disclosed herein relies upon the structural integrity of the support structure as a substitute for the rigidity provided by the frame rails.

Once the support frame and operable unit (collectively the integral unit) are securely attached to the distal ends of the severed frame rails the previously removed one or more axles with differentials are remounted to the operable unit. Alternatively, because the operable unit may have very distinct functional and operational characteristics a completely different axle, or set of axles, may be remounted. Following the remounting of the one or more axles, the drive shaft is reconnected to the U-joint leading into the differential. The length of the drive shaft may also need to be altered if the distance from the transmission output shaft to the differential has changed. Moreover, if additional axles are added to the operable unit, then one or more drive axles must be fabricated to span between the remounted axles and differentials.

It is therefore an object of the system and method disclosed herein to reconfigure a truck body to lower the center of gravity.

It is a further object of the system and method disclosed herein to improve compliance with the Federal Highway Administration regulations on truck size and weight found at 23 CFR § 658.

It is a further object of the system and method disclosed herein to decrease the overall height of the reconfigured truck body to improve bridge clearance nationwide.

It is a further object of the system and method disclosed herein to lessen the weight of the reconfigured truck body by removing a long span of the frame rails and thereby improving fuel economy of the reconfigured truck and reducing greenhouse gas emissions from the truck engine.

It is a further object of the system and method disclosed herein to reduce the turning radius of the truck.

Various objects, features, aspects, and advantages of the disclosed subject matter will become more apparent from the following detailed description of preferred embodiments, along with the accompanying drawings in which like numerals represent like components. The contents of this summary section are provided only as a simplified introduction to the disclosure and are not intended to be used to limit the scope of the appended claims.

The contents of this summary section are provided only as a simplified introduction to the disclosure and are not intended to be used to limit the scope of the appended claims.

DETAILED DESCRIPTION

Figure 1:
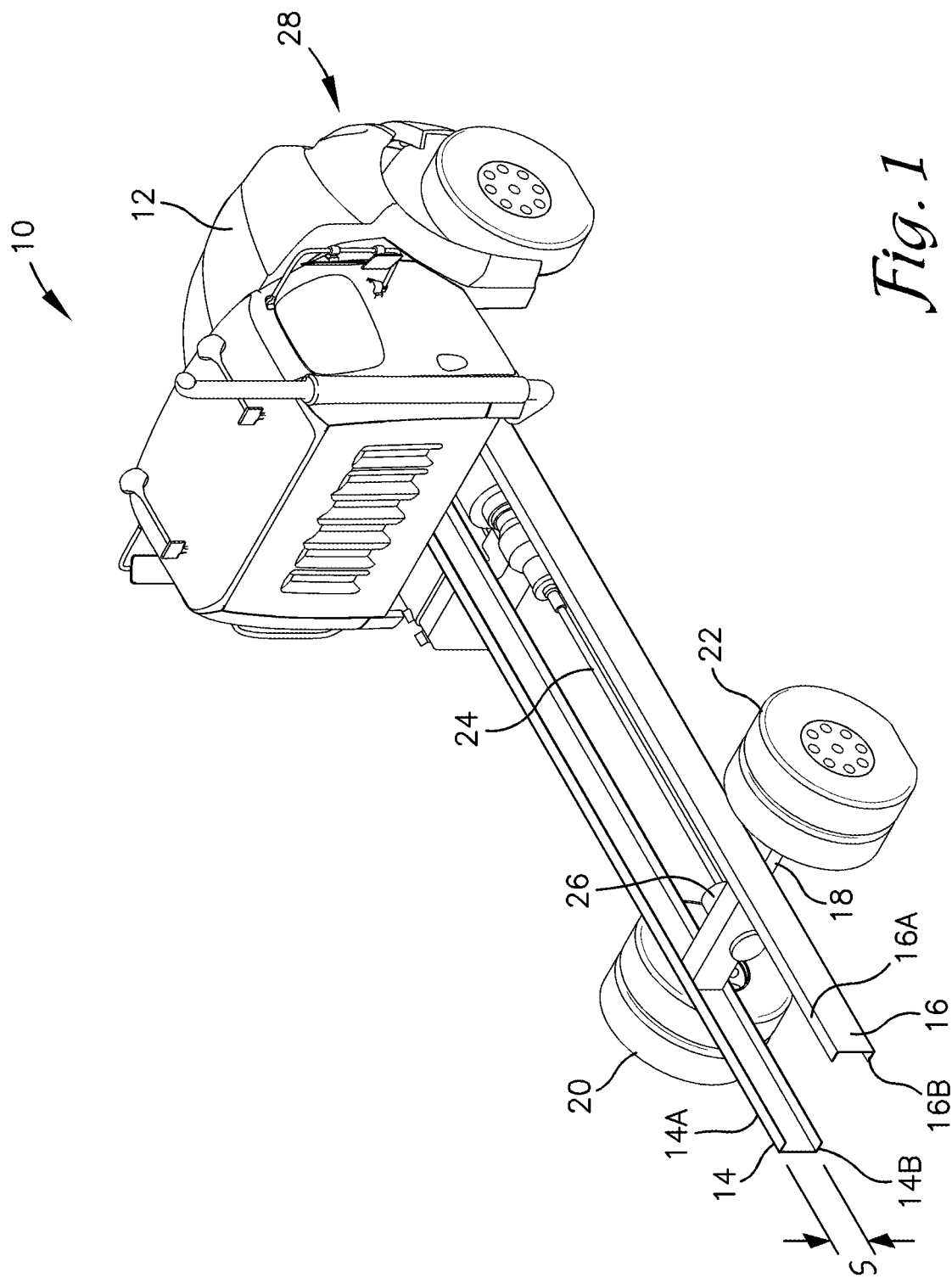
FIG. 1 illustrates a perspective view of an embodiment of a truck body with a cab and frame rails.
Figure 2:
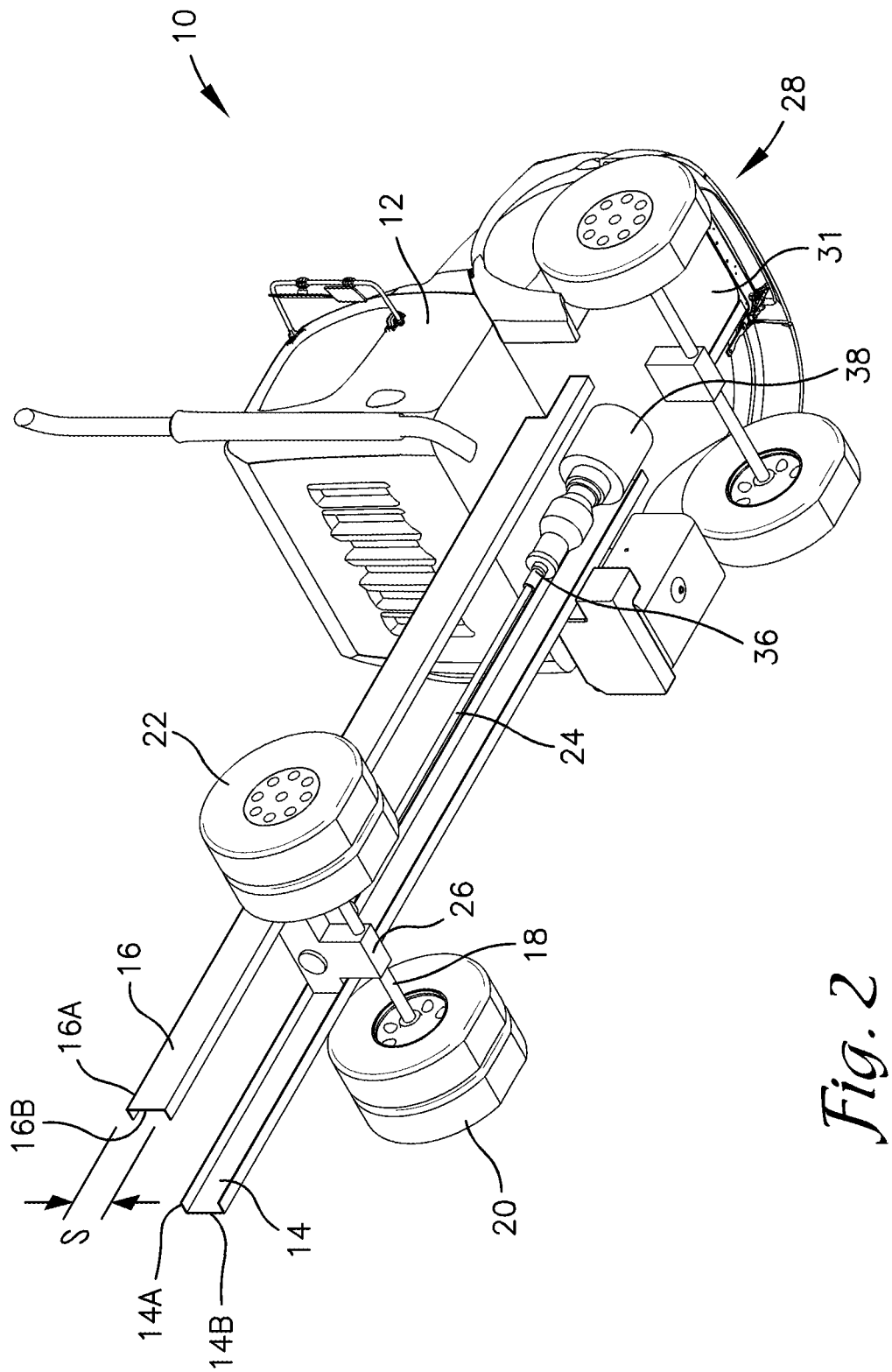
FIG. 2 illustrates a bottom view of an embodiment of a truck body.

FIG. 1 illustrates a typical embodiment of a truck body 10 with a cab 12, a pair of frame rails 14, 16 an axle 18 with a wheel 20, 22 at each opposed side of the axle 18. FIG. 2 illustrates the underside of the truck body including 10 a drive shaft 24 spanning from the transmission 38 of the truck body 10 to the differential 26 of the axle 18. The frame rails 14, 16 each having an upper surface 14A, 16A and a vertical span S.

Figure 4:
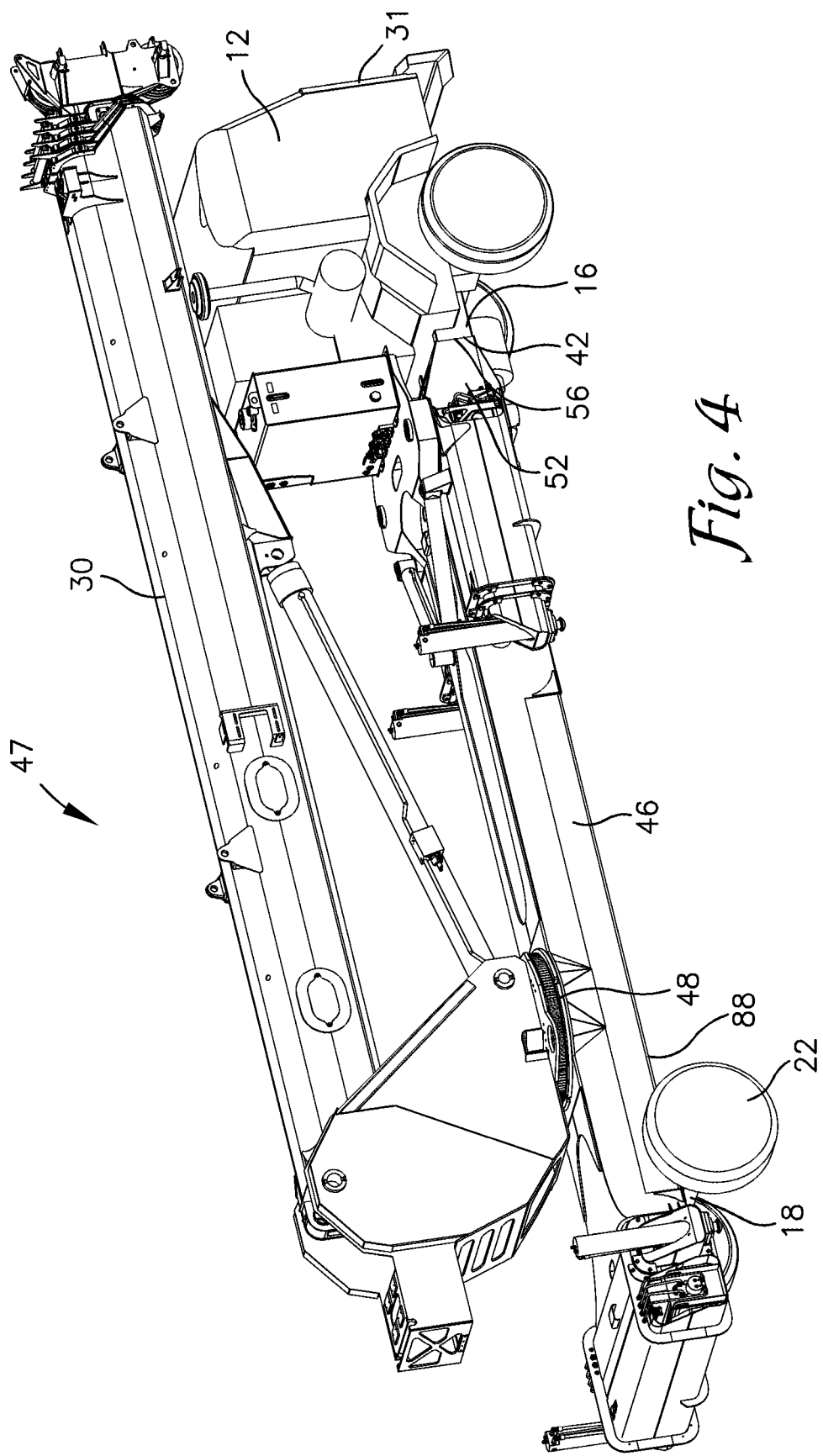
FIG. 4 illustrates a perspective view of an embodiment of an operable unit disposed atop a support frame with the support frame connected to the frame rails of the truck.

As further illustrated at FIG. 1, the frame rails 14, 16 span from the front 28 of the truck body 10 to behind the rearmost axle 18. In a typical prior art configuration of a truck utilized for construction purposes the operable unit, such as dump body or an extensible boom crane, rests atop and is supported by the frame rails 14, 16 each with a distal end 14B, 16B. The operable unit 30, as illustrated at FIG. 4, is transported to the specific location of interest by the motive power of the truck and the power to, for example, dump gravel, mix concrete or extend the boom are all powered by the engine 31 of the truck body 10.

The frame rails 14, 16 are typically fabricated from high yield strength steel. The frame rails 14, 16 may, for example, be 13-inch C-channel members with thickness up to 0.5 inch that can extend up to 40 feet in length; however, different frame rail dimensions are also contemplated by this disclosure. The two frame rails of a commercial truck can weigh in the range of 500 to 2,000 pounds and the frame rails 14, 16 have historically served as the foundation for the operable unit 30 to set upon.

For the system and method disclosed herein the axle 18 and all associated hardware, such as brake lines and electrical wiring, are detached from their runs along the frame rails 14, 16. Following detachment of the associated hardware from the frame rails, the drive shaft 24 is disconnected from the U-joints 36 at the differential 26 and optionally, but preferably, at the transmission 38.

The next step is to remove the one or more axles 18 and associated differentials 26 from the frame rails 14, 16. Various connection hardware is removed freeing the axle and differential from the frame rails. The one or more axle 18 and differentials 26 are separated from the frame rails 14, 16 providing space to continue the reconfiguration operation.

Figure 3:
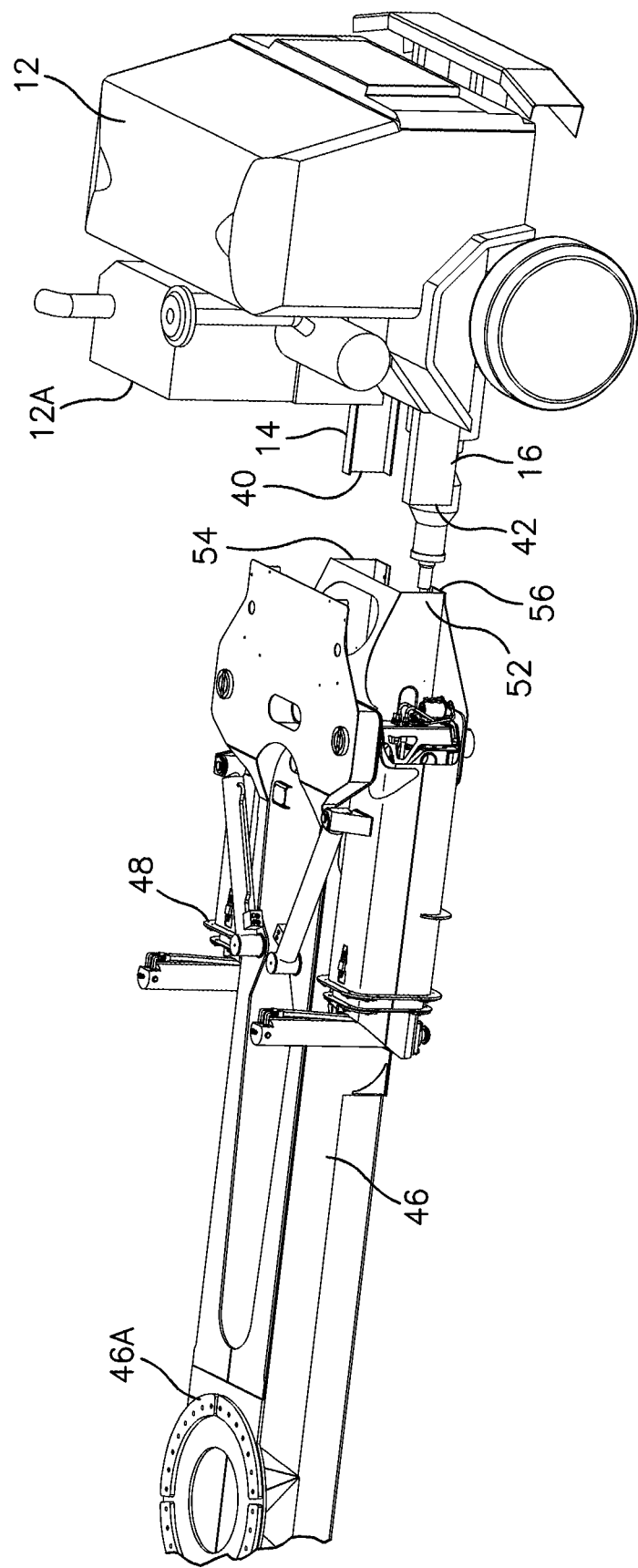
FIG. 3 illustrates a perspective view of an embodiment of a support frame operable for connection to the frame rails of the truck.

As illustrated at FIG. 3, following removal of the connection hardware, the reconfiguration process requires severing of the two frame rails 14, 16 in proximity to the rear 12A of the cab 12. The severed frame rails 14, 16 preferably extend a distance in the range of 12-to-30 inches beyond the rear of the cab 12 so that reconfiguration operations are not hindered by undesirable proximity to the exterior wall 12A of the cab 12. Processes for severing frame rails are well known in the industry and can be accomplished by various means such as plasma cutting devices, a cutting torch and a metal saw, to name just a few.

As illustrated at FIG. 3, severing of the frame rails 14, 16 near the rear of the cab 12 results in two new distal ends 40, 42 of the frame rails. These new distal ends 40, 42 of the frame rails 14, 16 are now intended to serve as areas of attachment for a support frame 46 with an upper surface 46A. The support frame 46 is configured to support the operable unit 30 upon the upper surface 46A. Exemplary operable units include dump bodies, cement mixers and extensible boom cranes, among potentially many other types of operable units. As illustrated at FIG. 4, the combined support frame 46 and operable unit 30 are henceforth referred to as the integral unit 47.

The support frame 46 is fabricated to maintain a low center of gravity with sufficient rigidity to support any operable unit that may ultimately be placed upon it. The support frame 46 is available for connection to the new distal ends 40, 42 of the frame rails 14, 16. The drop in elevation of the integral unit 47 depends in large measure upon the vertical span S, as shown at FIG. 1, of the frame rails 14, 16 that are severed.

Many frame rails of larger commercial trucks have a vertical span S of as much as 13 inches thereby providing a drop in elevation of the operable unit of at least 13 inches. This drop in elevation of the integral unit as compared to an operable unit placed atop the fully extended frame rails 14, 16 can mean a lowering of the center of gravity of the truck by potentially an amount equivalent to the vertical span S of the frame rails. A lower center of gravity tends to improve the highway speed handling capabilities of the truck body 10 particularly during extreme wind events and on curved roads.

As further illustrated at FIG. 4, the support frame 46 is designed and fabricated for connection to the distal ends 40, 42 of the severed frame rails. The support frame 46 includes attachment hardware 48 that is used to secure elements of the operable unit to the support frame 46. In a preferred embodiment, the attachment hardware 48 and operable unit 30 are configured for quick changeout with either a like-kind replacement operable unit or a functionally distinct operable unit.

The support frame 46 and integrated operable unit 30 are specifically designed and fabricated to reduce overall weight, maximize structural rigidity, lower the center of gravity of the combined support frame 46 and operable unit 30 as well as optimally position the one or more axles 18 beneath the support frame 46 to provide the greatest range of compliance options with federal bridge requirements. As noted above, the capacity to interchange operable units upon the support frame 46 to maximize functionality of the truck body system is fully contemplated by this disclosure.

In a first embodiment, as illustrated at FIG. 3, a forward end 52 of the support frame 46 is configured for alignment with and attachment to the distal ends 40, 42 of the severed frame rails 14, 16. The forward end 52 of the support frame 46 has outwardly extending members 54, 56 that lap (either internally or externally) the distal ends 40, 42 of the frame rails 14, 16. The outwardly extending members 54, 56 may, for example, be C-channels, plate members or box beams. The precise dimensions of the outwardly extending members 54, 56 depends upon the dimensions of the frame rails 14, 16.

Figure 5:
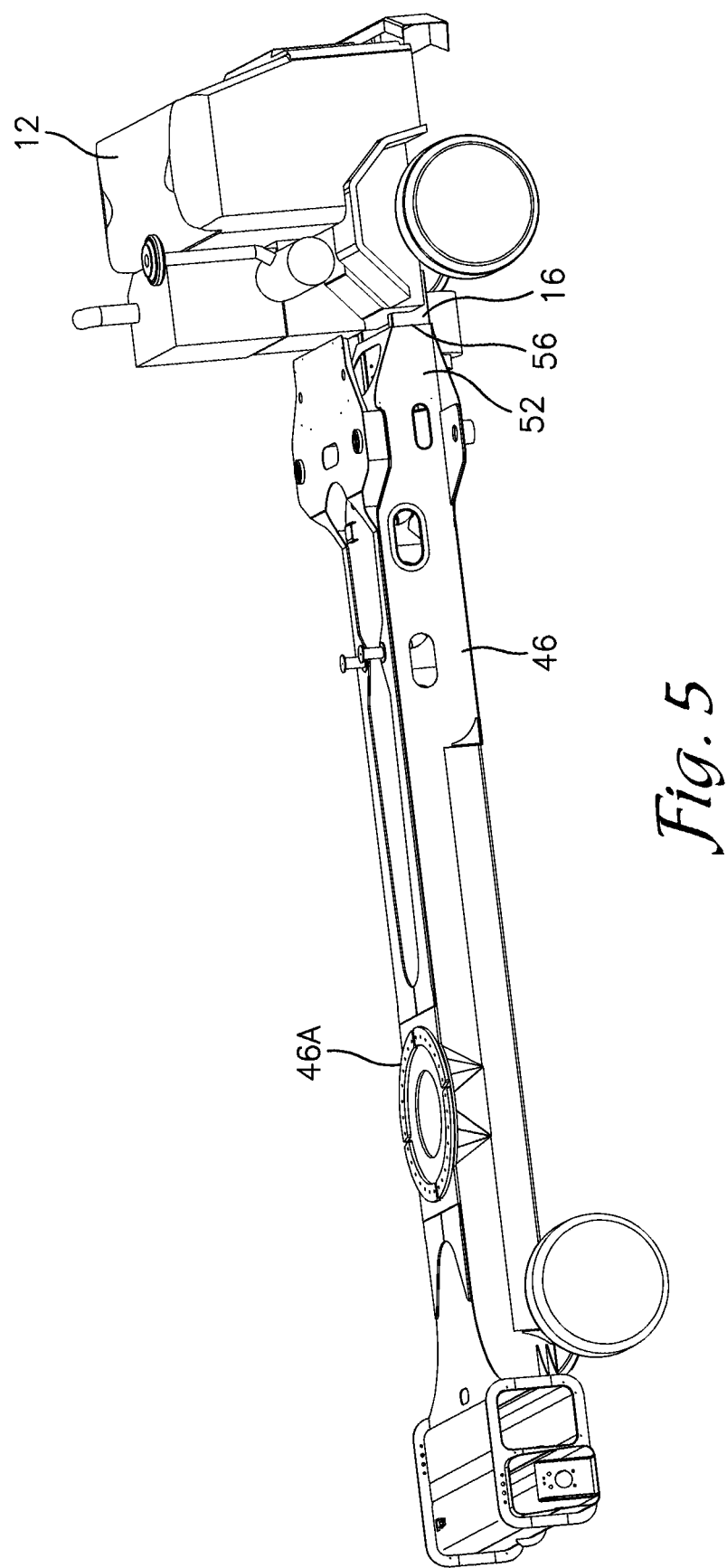
FIG. 5 illustrates a perspective view of an embodiment of the support frame welded to the frame rails of the truck.

The lap between the outwardly extending members 54, 56 and the distal ends 40, 42 extends at least twelve inches and preferably a greater distance to improve structural connectivity and rigidity between the frame rails 14, 16 and the outwardly extending members 54, 56. The outwardly extending members 54, 56 in this first embodiment as illustrated at FIGS. 3, 4 and 5, are welded directly to the distal ends 40, 42 of the severed frame rails 14, 16. A robust set of welds connecting the outwardly extending members 54, 56 to the distal ends 40, 42 rigidly secures the truck body 10 to the support frame 46.

With the welded attachment of the outwardly extending members 54, 56 to the distal ends 40, 42 of the frame rails 14, 16, as illustrated at FIG. 4, the integral unit, comprised of the support frame 46 and the operable unit 30 along with the cab 12 have a lower center of gravity. Additionally, the assembled unit has a reduced overall weight due to the removal of a significant portion of the frame rails 14, 16 which as noted above, can weigh as much as 2,000 pounds. As also previously noted, the reduced weight reduces rolling resistance of the truck tires and thereby reduces fuel consumption. A reduced consumption of fossil fuel in turn reduces greenhouse gas emissions.

Figure 6:
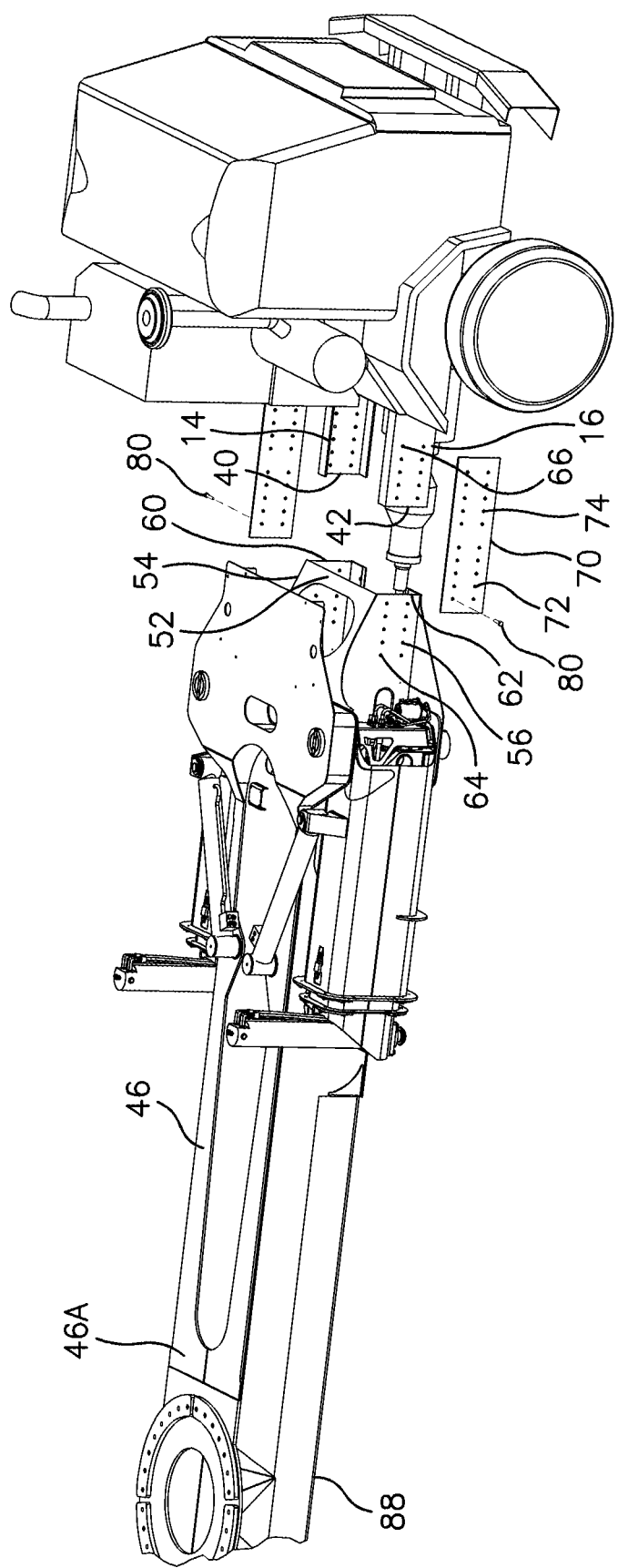
FIG. 6 illustrates a perspective view of an embodiment of a coupling plate for securing the support frame to the frame rails of the truck.

In a second embodiment, as illustrated at FIG. 6, a forward end 52 of the support frame 46 is also configured for alignment with and attachment to the distal ends 40, 42 of the severed frame rails 14, 16. In this embodiment, the outwardly extending members 54, 56 near their proximal ends 60, 62 include a plurality of through holes 64 arranged in a pattern to facilitate attachment to the distal ends 40, 42 of the severed frame rails 14, 16. The distal ends 40, 42 of the frame rails 14, 16 have a similar pattern of through holes 66.

In this second embodiment; however, the outwardly extending members 54, 56 do not lap (neither inside nor outside) the distal ends 40, 42 of the severed frame rails 14, 16. Instead, a coupling plate 70 with a first plurality of holes 72 is positioned for alignment with the plurality of through holes 64 near the proximal ends 60, 62 of the outwardly extending members 54, 56. The coupling plate 70 also has a second plurality of through holes 74 disposed opposite the first plurality of through holes 72.

This second plurality of through holes 74 are aligned with through holes 66 in the distal ends 40, 42 of the severed frame rails 14, 16. Once the lapping alignment of the plurality of through holes 64, 66, 72, 74 disposed within the coupling plate 70, the proximal ends 60, 62 of the outwardly extending members 54, 56 and the distal ends 40, 42 of the severed frame rails 14, 16 is complete, then fasteners 80 are passed into the plurality of aligned through holes.

The fasteners 80 preferably have a diameter that is slightly larger than the diameter of the through holes 64, 66, 72, 74 found in the severed frame rails 14, 16, the coupling plate 70 and the outwardly extending members 54, 56. The fasteners 80 may optionally be press fit or impact driven into the slightly undersized through holes 64, 66, 72, 74 thereby ensuring a friction fit that eliminates the prospect of undesirable wiggle within the coupled assembly. Alternatively, threaded fasteners 80 may be employed and tightened using a tool capable of delivering a high torque. Additionally, lock washers may be employed with the threaded fasteners to decrease the likelihood of one or more fasteners becoming loose and causing the coupling plate 70 attachment to fail.

The second embodiment, much as with the first embodiment, results in an operable unit, as best illustrated at FIG. 4, that is lower in elevation than if the originally installed frame rails 14, 16 and not the support frame 46 supported the operable unit 30. The support frame 46 is mounted upon one or more axles 18 that are installed against a lower surface 88 of the support frame. If more than one axle 18 are mounted, they are preferably spaced apart from one another to optimize compliance with federal bridge regulations.

Figure 7:
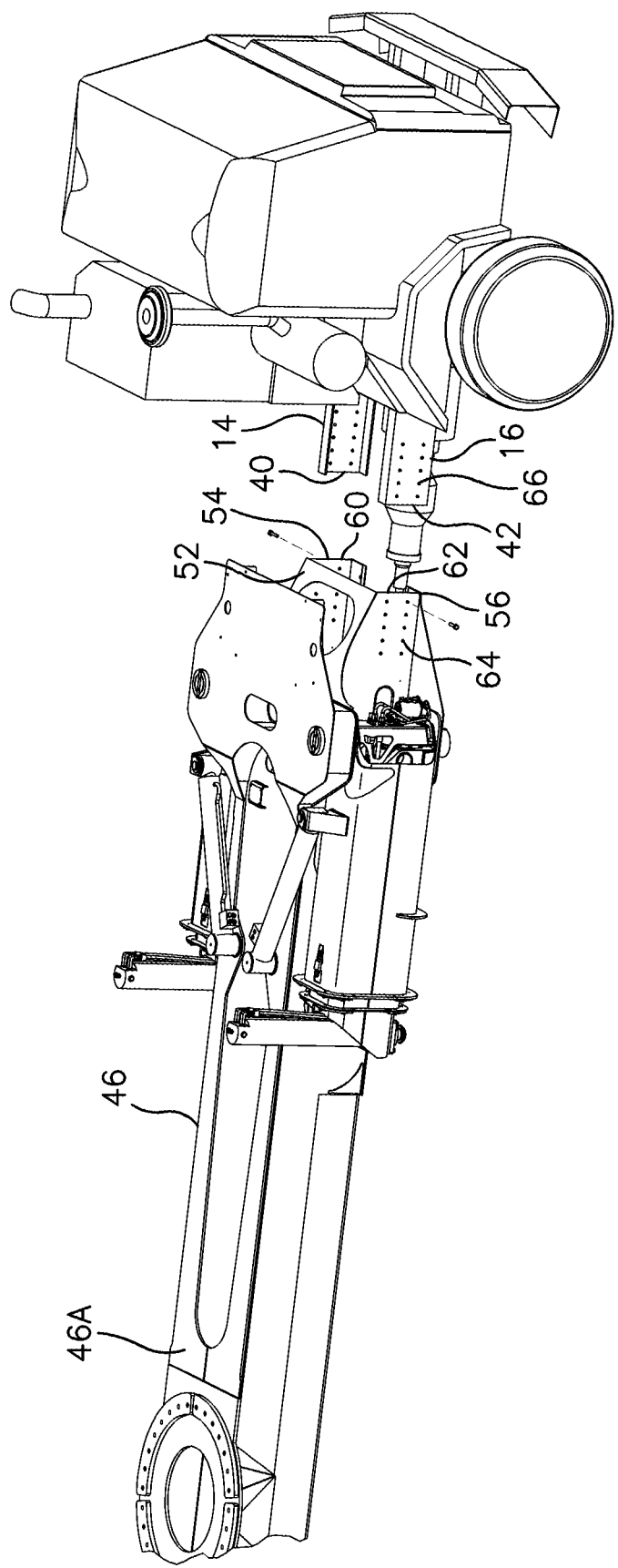
FIG. 7 illustrates a perspective view of an embodiment of a lapped assembly of the support frame prior to attachment to the frame rails of the truck.
Figure 8:
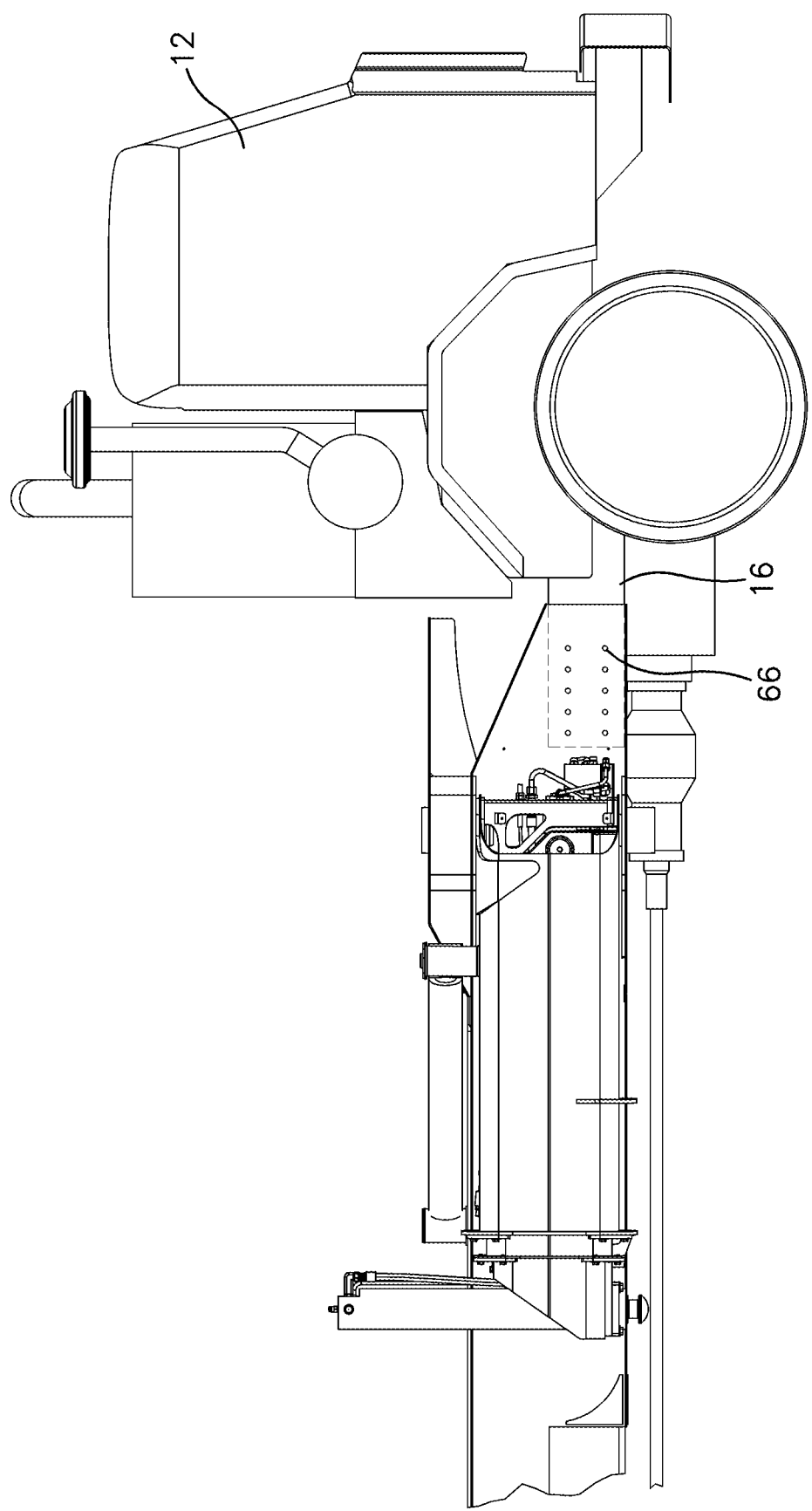
FIG. 8 illustrates a side view of an embodiment of a lapped assembly of the support frame after attachment to the frame rails of the truck.

In a third embodiment as illustrated at FIGS. 7 and 8, a forward end 52 of the support frame 46 is also configured for alignment with and attachment to the distal ends 40, 42 of the severed frame rails 14, 16. In this third embodiment, the outwardly extending members 54, 56 near their proximal ends 60, 62 also include a plurality of through holes 64 arranged in a pattern to facilitate attachment to the distal ends 40, 42 of the severed frame rails 14, 16.

The distal ends 40, 42 of the frame rails 14, 16 have a similar pattern of through holes 66. In this embodiment, however, a coupling plate is not utilized. Instead, the plurality of through holes 66 in the severed frame rails 14, 16 are aligned with and lap (either inside or outside) the through holes 64 in the outwardly extending members 54, 56 near their proximal ends 60, 62. Likewise with the second embodiment, as best illustrated at FIG. 6, fasteners 80 are passed through the lapped holes 64, 66 thereby rigidly securing the outwardly extending members 54, 56 to the severed frame rails 14, 16. FIG. 8 illustrates the third embodiment with the outwardly extending members 54, 56 lapping the severed frame rails 14, 16 at their distal ends 40, 42 ready for the installation of fasteners.

While not a significant departure from the coupling plate 70 configuration in the second embodiment it achieves the same desired outcome—to lower not only the final height of the operable unit 30 but also the center of gravity of the integral unit 50 and cab 12 combination. This lower center of gravity improves both handling performance of the truck during high wind events as well as at higher speed travel on curved roads. The goal of all three disclosed embodiments is to maintain a structurally rigid connection between the distal ends 40, 42 of the frame rails 14, 16 and the outwardly extending members 54, 56 of the support frame 46.

As previously noted, a critical feature of the support frame 46 is that it is designed and fabricated to include an upper surface 46A that is at a lower elevation than the longitudinally extending upper surfaces 14A, 16A of the severed frame rail segments 14, 16 by at least the vertical span S of the frame rails 14, 16. The upper surface 46A of the support frame 46 may be as much as 13 inches lower than if the upper surfaces 14A, 16A of the severed frame rails had been used as a foundation for an operable unit 30.

Considering that the maximum height of a truck for passage beneath many overpasses in the United States is 13 feet, 6 inches it is conceivable that the reconfigured truck using the method disclosed herein achieves a height that may be up to eight percent less than if the original frame rails 14, 16 had been used as the operable unit 30 support platform thereby allowing passage of more trucks beneath these lowest of overpasses.

While an eight percent height reduction may not seem like much of an accomplishment, that reduction of over one foot in elevation can greatly influence the location of the center of gravity as well as the center of rotation of the truck body 10. There are tremendous efforts underway by truck designers and fabricators to lower the center of gravity of trucks to improve their performance particularly at highway speeds on curved roads and during powerful wind events.

A lower center of gravity can be extremely beneficial to avoid tipping of the truck during sharp turns at higher speeds and with meteorological events that include powerful winds driven by tornados and hurricanes. One major impediment to the desired lowering of the center of gravity is the elevation of the frame rails. If the frame rails 14, 16 can be removed and replaced with members that are of comparable structural strength but of a lesser elevation, then the potential for an overturned truck can be greatly reduced.

The system and method disclosed herein can also yield considerable benefits for achieving compliance with the Federal Highway Administration bridge formula weights set forth at 23 U.S.C. § 127 and codified at 23 C.F.R. § 658. Congress enacted the Bridge Formula in 1975 to limit the weight-to-length ratio of a vehicle crossing a bridge. This is accomplished either by spreading weight over additional axles or by increasing the distance between axles. Compliance with Bridge Formula weight limits is determined by using the following formula:

$$W = 500 [LN/(N-1) + 12N + 36]$$

W=the maximum permissible weight;
L=the distance in feet between the outer axles of any group of two or more consecutive axles; and
N=the number of axles in the group under consideration.

Federal law provides that any two or more consecutive axles may not exceed the weight computed by the Bridge Formula even though single axles, tandem axles, and gross weight are within legal limits. As a result, the axle group that includes the entire truck-sometimes called the "outer bridge" group-must comply with the Bridge Formula. However, interior combinations of axles, such as the "tractor bridge" (axles 1, 2, and 3) and "trailer bridge" (axles 2, 3, 4, and 5), must also comply with weights computed by the Bridge Formula.

Prior to commencing attachment of the one or more axles 18 to the support frame 46, calculations, pursuant to the federal Bridge Formula, can be performed to assess the requisite number and spacing of the axles 18. The support frame 46 is preferably fabricated to facilitate slidable positioning of the axles 18 to accommodate changes in loading patterns that may arise due to changes in the configuration of the operable unit 30. Once the axles 18 are positioned, attached and secured to the support frame 46, the drive shaft 24 is then reconnected to the U-joints 36 at the differential 26 and at the transmission 38.

The disclosed system and method should not be construed as limiting in any way. Instead, the present disclosure is directed toward all novel and nonobvious features and aspects of the various disclosed embodiments, alone and in various combinations and sub-combinations with one another. The disclosed method is not limited to any specific aspect or feature or combination thereof, nor do the disclosed embodiments require that any one or more specific advantages be present, or problems be solved.

In view of the many possible embodiments to which the principles of the disclosed invention may be applied, it should be recognized that the illustrated embodiments are only examples of the disclosure and should not be taken as limiting the scope of the invention. Rather, the scope of the invention is defined by the following claims. We therefore claim as our invention all that comes within the scope of these claims.

The disclosure presented herein is believed to encompass at least one distinct invention with independent utility. While the at least one invention has been disclosed in exemplary forms, the specific embodiments thereof as described and illustrated herein are not to be considered in a limiting sense, as numerous variations are possible. Equivalent changes, modifications, and variations of the variety of embodiments, materials, compositions, and methods may be made within the scope of the present disclosure, achieving substantially similar results. The subject matter of the at least one invention includes all novel and non-obvious combinations and sub-combinations of the various elements, features, functions and/or properties disclosed herein and their equivalents.

Benefits, other advantages, and solutions to problems have been described herein regarding specific embodiments. However, the benefits, advantages, solutions to problems, and any element or combination of elements that may cause any benefits, advantage, or solution to occur or become more pronounced are not to be considered as critical, required, or essential features or elements of any or all the claims of at least one invention.

Many changes and modifications within the scope of the instant disclosure may be made without departing from the spirit thereof, and the one or more inventions described herein include all such modifications. Corresponding structures, materials, acts, and equivalents of all elements in the claims are intended to include any structure, material, or acts for performing the functions in combination with other claim elements as specifically recited. The scope of the one or more inventions should be determined by the appended claims and their legal equivalents, rather than by the examples set forth herein.

Benefits, other advantages, and solutions to problems have been described herein regarding specific embodiments. Furthermore, the connecting lines, if any, shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions.

The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

In the detailed description herein, references to "one embodiment," "an embodiment," "an example embodiment," etc., indicate that the embodiment described may include a feature, structure, or characteristic, but every embodiment may not necessarily include the feature, structure, or characteristic. Moreover, such phrases are not necessarily referring to the same embodiment. Further, when a feature, structure, or characteristic is described relating to an embodiment, it is submitted that it is within the knowledge of one skilled in the art to affect such feature, structure, or characteristic relating to other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. § 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention has been described above with reference to one or more preferred embodiments, it will be appreciated that various changes or modifications may be made without departing from the scope of the invention as defined in the appended claims.

We claim:

1. A method for reconfiguring a truck body, the method comprising:
    selecting a truck, wherein the truck comprises:
    (i) a cab section;
    (ii) a pair of original frame rails extending from beneath the cab section and rearwardly to a distal first and second end, each of the pair of original frame rails comprising a vertical span and an upper surface;
    (iii) at least one axle with a differential, the at least one axle secured to each of the pair of original frame rails proximate the first and second distal ends;
    (iv) a drive shaft with a first end and a second end, the first end of the drive shaft operably connected to an output shaft of a transmission, the drive shaft extending rearwardly for operable engagement of the second end with an original differential;
    disconnecting the drive shaft from the original differential;
    removing the at least one axle from attachment to the original frame rails;
    severing the pair of original frame rails proximate the cab section resulting in new first and second distal ends for the frame rails proximate the cab section as well as first and second excess frame rail segments;
    attaching directly, longitudinally extending members of a support frame to the new first and second distal ends of the frame rails, wherein the support frame is configured to support an operable unit upon an upper surface of the support frame, the combined support frame and operable unit comprising a lesser weight and lower center of gravity than a configuration comprising the operable unit disposed upon the first and second excess frame rail segments; and mounting of the at least one axle to a lower surface of the support frame.

2. The method of reconfiguring a truck body of claim 1, wherein the operable unit comprises at least one of a dump body, a cement mixer or an extensible boom crane.

3. A method for reconfiguring a truck to lower a center of gravity, reduce a vehicle height, a vehicle weight and a fuel consumption of the truck and optimize axle weights for compliance with federal bridge standards, the method comprising:

selecting the truck, wherein the truck comprises:
(i) a cab section;
(ii) a first and second frame rail each with an upper surface and a vertical span, the first and second frame rails extending from beneath the cab section and rearwardly to a first and second distal end;
(iii) at least one axle with a differential, the at least one axle secured to the first and second frame rails proximate the first and second distal ends;
(iv) a drive shaft with a first end and a second end, the first end of the driveshaft connected to an output shaft of a transmission, the drive shaft extending rearwardly for operable engagement of the second end with the differential;

disconnecting the drive shaft from the differential;
removing the at least one axle from the first and second frame rails;
severing the first and second frame rails proximate the cab section resulting in new first and second distal ends for the frame rails proximate the cab as well as first and second excess frame rail segments, each of the new first and second distal ends of the frame rails comprising an upper surface and a lower surface;
attaching directly, longitudinally extending members of a support frame to the new first and second distal ends of the frame rails at the same vertical height as the new first and second distal ends wherein the support frame is configured to support an operable unit upon an upper surface of the support frame, the support frame and operable unit comprising a lesser weight and lower center of gravity than a configuration comprising the operable unit disposed upon the first and second excess frame rail segments; and
remounting of the at least one axle to the support frame.

4. The method of reconfiguring the truck body of claim 3, wherein the operable unit comprises at least one of a dump body, a cement mixer or an extensible boom crane.

5. The method of reconfiguring the truck body of claim 3, wherein the new distal end of the first and second frame rails are secured respectively to the distal end of a first and second outwardly extending members of the support frame by welding the new distal end of the first and second frame rails respectively to the first and second outwardly extending members.

6. The method of reconfiguring the truck body of claim 5, wherein a plurality of through holes are disposed proximate the new distal end of the first and second frame rails as well as in a distal end of the first and second outwardly extending members of the support frame.

7. The method of reconfiguring the truck body of claim 6, wherein the plurality of through holes in the new distal end of each frame rail are aligned with the through holes in the distal end of the first and second outwardly extending members of the support frame.

8. The method of reconfiguring the truck body of claim 7, wherein a fastener is secured in position within each of a plurality of over lapping through holes.

9. The method of reconfiguring the truck body of claim 6, wherein the step of attaching comprises alignment of a portion of a plurality of through holes in a coupling plate with the through holes in the new distal ends of each frame rail and the alignment of a remaining portion of through holes in the coupling plate with the through holes in the distal ends of the first and second outwardly extending members of the support frame.

10. The method of reconfiguring the truck body of claim 9, wherein a fastener is positioned within the aligned through holes thereby rigidly securing together the coupling plate, the new distal ends of the first and second frame rails, and the distal ends of the first and second outwardly extending members of the support frame.

11. The method of reconfiguring the truck body of claim 3, wherein the weight of the reconfigured truck body is reduced in the range of 500 to 2,000 pounds upon removal of the severed portion of the frame rails thereby increasing fuel economy and reducing the emission of greenhouse gases from an engine of the truck.

12. The method of reconfiguring the truck body of claim 3, wherein the at least one axle is secured to a lower surface of the support frame opposite the first and second outwardly extending members.

13. The method of reconfiguring the truck body of claim 12, wherein an axle spacing of the support frame is adjustable to achieve compliance with 23 C.F.R. § 658 Truck Size and Weight, Route Designations—Length, Width and Weight Limitations.

14. A reconfigured truck body system, the system comprising:

a cab section;
first and second frame rails each with an upper surface and a vertical span, the first and second frame rails severed proximate the cab section forming respective new first and second distal ends as well as first and second excess frame rail segments;
a support frame attached directly to the new first and second distal ends, wherein the support frame is configured to support an operable unit upon an upper surface of the support frame, the operable unit and support frame comprising a lesser total weight and lower center of gravity than the combined weight of the operable unit and the excess frame rail segments; and
at least one axle mounted to the support frame.

15. The reconfigured truck body system of claim 14, wherein the at least one axle is selectively positionable along a lower surface of the support frame to achieve compliance with 23 C.F.R. § 658 Truck Size and Weight, Route Designations—Length, Width and Weight Limitations.

16. The reconfigured truck body system of claim 14, wherein the operable unit comprises at least one of a dump body, a cement mixer or an extensible boom crane and the operable unit is interchangeable upon the support frame.

17. The reconfigured truck body system of claim 13, wherein the center of gravity of the reconfigured truck body system is lower by up to the span of the severed first and second frame rails.

18. The reconfigured truck body system of claim 13, wherein the frame rails are severed at a distance of at least 6 inches behind a rear wall of the cab.

19. The reconfigured truck body system of claim 13, wherein a first and second outwardly extending members of the support frame are at least one of C-channels, box beams, or plate members.

* * * * *